United States Patent
Koren et al.

(10) Patent No.: US 8,121,123 B2
(45) Date of Patent: Feb. 21, 2012

(54) METHOD FOR MULTICASTING OF PACKETS IN PON RESIDENTIAL GATEWAYS

(75) Inventors: Asaf Koren, Herzliya (IL); Gil Levy, Herzliya (IL); Michael Balter, Tel-Aviv (IL); Ifat Naaman, Ra'anana (IL)

(73) Assignee: Broadlight, Ltd., Herzliya (IL)

( * ) Notice: Subject to any disclaimer, the term of this patent is extended or adjusted under 35 U.S.C. 154(b) by 252 days.

(21) Appl. No.: 12/277,133

(22) Filed: Nov. 24, 2008

(65) Prior Publication Data

US 2010/0098076 A1    Apr. 22, 2010

Related U.S. Application Data

(63) Continuation-in-part of application No. 12/254,187, filed on Oct. 20, 2008, now Pat. No. 7,801,161.

(51) Int. Cl.
*H04L 12/56* (2006.01)
(52) U.S. Cl. ........................................ 370/390
(58) Field of Classification Search .................. 370/390, 370/389, 395, 395.41, 412, 428, 466, 468
See application file for complete search history.

(56) References Cited

U.S. PATENT DOCUMENTS

| | | | |
|---|---|---|---|
| 6,272,134 B1 * | 8/2001 | Bass et al. | 370/390 |
| 7,286,538 B2 | 10/2007 | Song et al. | |
| 7,289,501 B2 | 10/2007 | Davis | |
| 2005/0013314 A1 | 1/2005 | Lim et al. | |
| 2006/0083252 A1 * | 4/2006 | Sakuraba et al. | 370/400 |
| 2007/0195761 A1 * | 8/2007 | Tatar et al. | 370/389 |
| 2008/0037535 A1 | 2/2008 | Yoon et al. | |
| 2009/0109972 A1 * | 4/2009 | Chen | 370/390 |

* cited by examiner

*Primary Examiner* — Dang Ton
*Assistant Examiner* — Nourali Mansoury
(74) *Attorney, Agent, or Firm* — Myers Wolin, LLC

(57) ABSTRACT

A method for multicasting packets in a passive optical network (PON) residential gateway. The method comprises storing a payload portion of an input packet in a memory; duplicating a header of the input packet to create duplicate headers as the number of destination end-point devices; modifying each of the duplicated header to uniquely designate an output interface of an Ethernet medium access (MAC) adapter coupled to at least one of the destination endpoint devices; passing to the Ethernet MAC adapter its respective modified header together with a pointer to a location of the payload portion in the memory; generating a multicast packet by retrieving the payload portion from the memory and attaching the modified header to the payload portion; and transmitting the multicast packet to the destination endpoint device coupled to the Ethernet MAC adapter.

12 Claims, 5 Drawing Sheets

METHOD FOR MULTICASTING OF PACKETS IN PON RESIDENTIAL GATEWAYS

CROSS REFERENCE TO RELATED APPLICATIONS

This application is a continuation-in-part of U.S. application Ser. No. 12/254,187 filed on Oct. 20, 2008 the contents of which are herein incorporated by reference.

TECHNICAL FIELD

The present invention relates generally to PON residential gateways, and more particularly to multicasting packets in PON residential gateways.

BACKGROUND OF THE INVENTION

As the demand from users for bandwidth is rapidly increasing, optical transmission systems, where subscriber traffic is transmitted using optical networks, is installed to serve this demand. These networks are typically referred to as fiber-to-the-curb (FTTC), fiber-to-the-building (FTTB), fiber-to-the-premise (FTTP), or fiber-to-the-home (FTTH). Each such network provides an access from a central office (CO) to a building, or a home, via optical fibers installed near or up to the subscribers' locations. As the transmission quantity of such an optical cable is much greater than the bandwidth actually required by each subscriber, a passive optical network (PON), shared between a plurality of subscribers through a splitter, was developed.

An exemplary diagram of a typical PON 100 is schematically shown in FIG. 1. The PON 100 includes M optical network units (ONUs) 120-1 through 120-M (individually referred to generally as ONU 120), coupled to an optical line terminal (OLT) 130 via a passive optical splitter 140. Traffic data transmission may be achieved by using two optical wavelengths, one for the downstream direction and another for the upstream direction. Downstream transmission from the OLT 130 is broadcast to all ONUs 120. Each ONU 120 filters its respective data according to, for example, pre-assigned labels. The ONUs 120 transmit respective data to the OLT 130 during different time slots allocated by the OLT 130 for each ONU 120. The splitter 140 splits a single line into multiple lines, for example, 1 to 32, or, in case of a longer distance from OLT 130 to ONUs 120, 1 to 16. A plurality of endpoint devices (not shown) typically through residential gateway are connected to each ONU 120. A packet sent from the OLT 130 may be multicast to endpoint devices connected to an ONU 120.

Gigabit PON (GPON) is an emerging standard currently being adopted by many telecommunication companies in order to deliver high-speed data services to their subscribers. These services typically include a bundle of TV broadcasting, Internet, and telephone services. To provide these services, an ONU 120 is connected to a residential gateway installed in the premises. As illustrated in FIG. 2, an input of a residential gateway 210 is connected to an ONU 120. The gateway's 210 outputs are coupled to a plurality of endpoint devices 220-1 through 220-N (individually referred to generally as an endpoint device 220). An endpoint device 220 may be, for example, a telephone device, a TV setup box, and a computer to which Internet connectivity is provided. Generally, a residential gateway may provide the functionality of modem and router and may be, for example, a cable modem, a router, a switch, a wireless modem, a wireless router, and so on.

In some cases a data packet sent from the OLT 130 (see FIG. 1) should be multicast to all or some of the endpoint devices 220 coupled to the residential gateway 210. In addition, a data packet sent from an endpoint device 220 can be multicast to some or all other endpoint devices 220. A data packet sent from the OLT 130 over the PON is typically in the form a GEM frame and a data packet directed to or received from an endpoint device is a form of a medium access (MAC) packet. A MAC packet typically includes a payload portion and a header designating at least a MAC address of an endpoint device 220.

When receiving a packet (either a GEM frame or a MAC packet), the residential gateway 210 determines if the packet needs to be multicast to a multicast group, and if so the residential gateway 210 generates MAC packets to be sent to endpoint device 220 in the multicast group. A multicast group includes one or more destination endpoint devices 220 and ports through which multicast frames will be transmitted.

Generally, there are two techniques to generate multicast packets. One technique includes duplicating the payload portion and generating a header to include an address of a destination endpoint device 220 and/or an output interface through which the packet should be sent. The header is created by hard coding the MAC address. Such solution may save in memory space and memory bandwidth as only the payload is duplicated (instead of the entire packet), but there is no flexibility when new endpoint devices 220 having addresses which are not pre-coded are connected to the gateway 210. Another solution includes duplicating the entire data packet and modifying the header to designate the MAC and port ID using a software process. This is a flexible solution, but utilization of the memory space and memory bandwidth is not optimal.

SUMMARY OF THE INVENTION

Certain embodiments of the invention include a method for multicasting packets in a passive optical network (PON) residential gateway. The method comprises storing a payload portion of an input packet in a memory; duplicating a header of the input packet to create duplicate headers as the number of destination endpoint devices; modifying each of the duplicated headers to uniquely designate an output interface of an Ethernet medium access (MAC) adapter coupled to at least one of the destination endpoint devices; passing to the Ethernet MAC adapter its respective modified header together with a pointer to a location of the payload portion in the memory; generating a multicast packet by retrieving the payload portion from the memory and attaching the modified header to the payload portion; and transmitting the multicast packet to the destination endpoint device coupled to the Ethernet MAC adapter.

Certain embodiments of the invention also include adapted to a residential gateway multicast data packets in a passive optical network (PON). The residential gateway comprises a plurality of Ethernet media access control (MAC) adapters for interfacing with a plurality of endpoint devices; a PON MAC adapter for interfacing with an optical line terminal (OLT) of the PON; and a memory for storing at least payload portions of input packets; and at least one packet processor for performing the process of multicasting an input packet by: storing a payload portion of an input packet in the memory; duplicating the header of the input packet to create duplicate headers as the number of destination endpoint devices; modifying each of the duplicated header to uniquely designate an output interface of an Ethernet medium access (MAC) adapter coupled to at least one of the destination endpoint devices; passing to the Ethernet MAC adapter its respective modified header together with a pointer to a location of the payload portion in the memory; generating a multicast packet by retrieving the payload portion from the memory and attaching the modified header to the payload portion; and transmitting the multicast packet to the destination endpoint device coupled the Ethernet MAC adapter.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
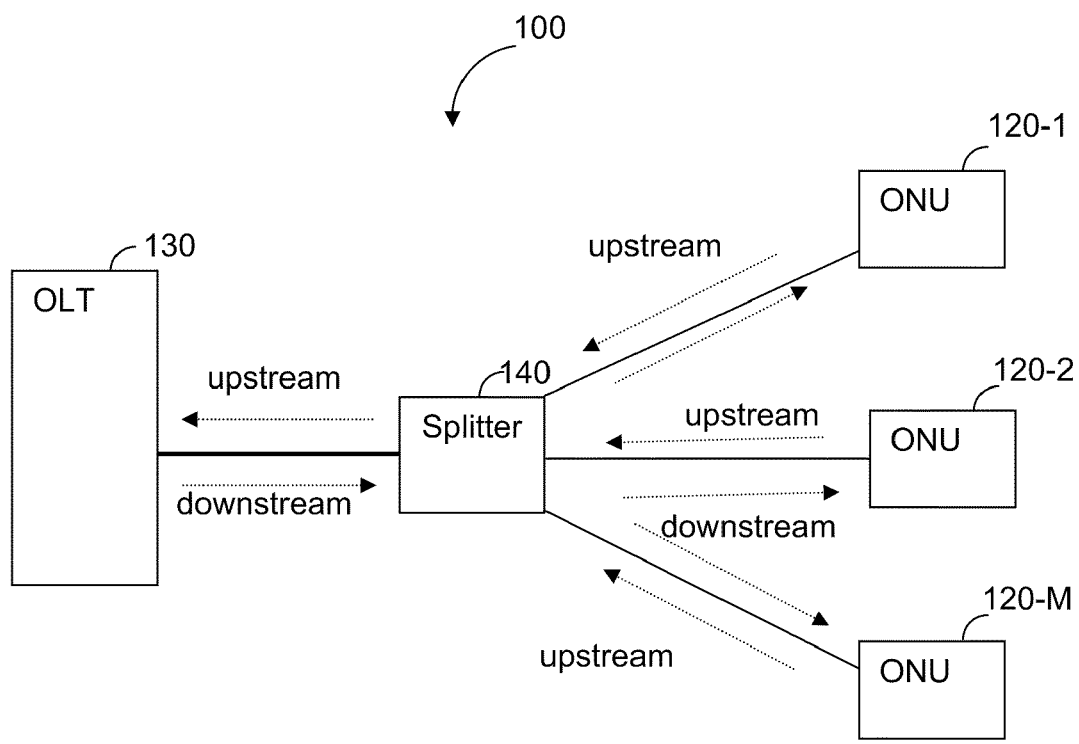
FIG. 1 is an exemplary diagram of a PON.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
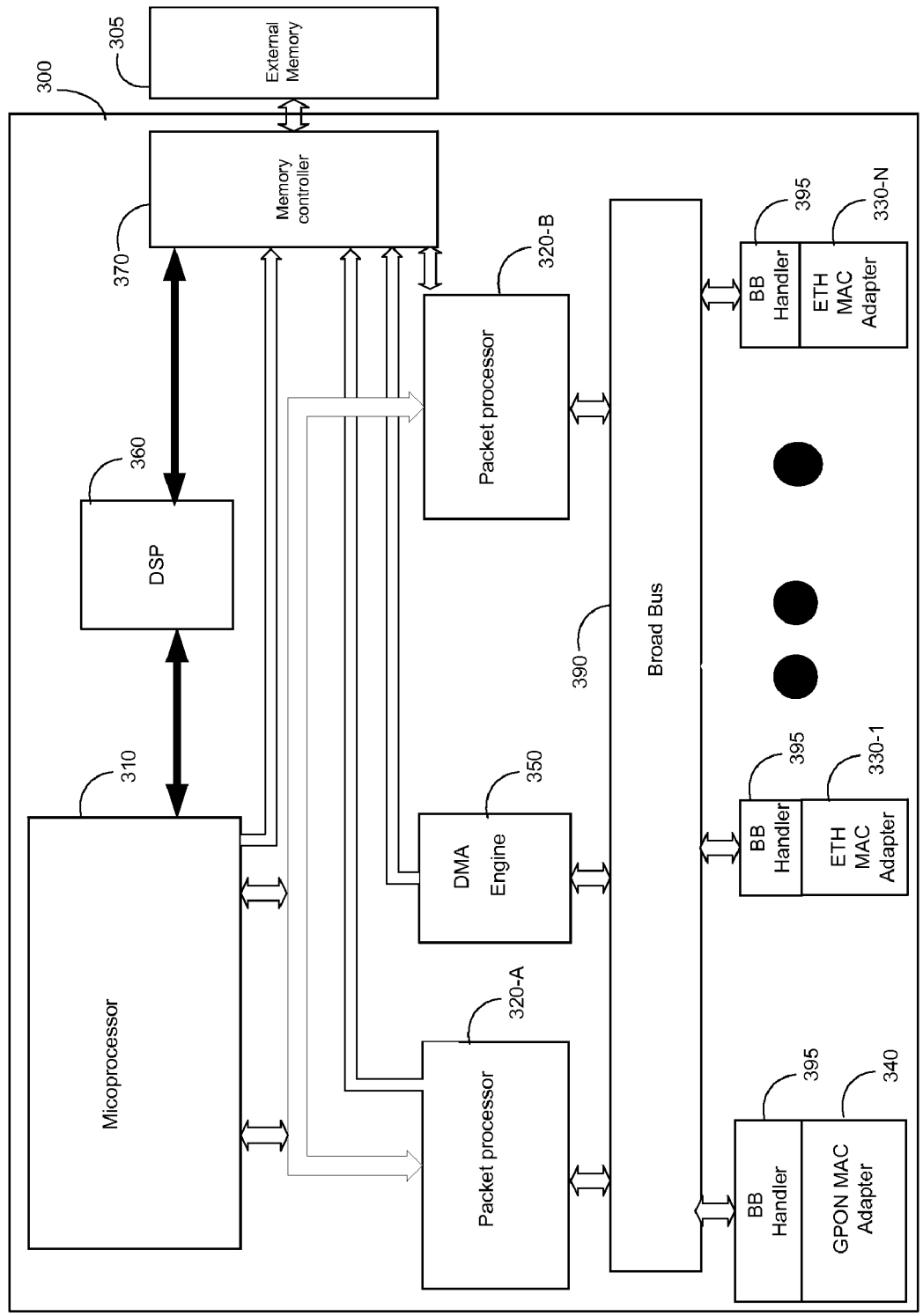
FIG. 3 is a diagram of the GPON residential gateway utilized for multicasting packets in a GPON according to an embodiment of the invention.

FIG. 3 shows a non-limiting and exemplary block diagram of a GPON residential gateway 300 utilized for multicasting packets in a GPON according to an embodiment of the invention. The GPON residential gateway 300 includes a microprocessor 310, dual packet processors 320-A and 320-B (individually referred to generally as packet processor 320), a plurality of Ethernet media access control (MAC) adapters 330-1 through 330-N (individually referred to generally as Ethernet adapter 330), a GPON MAC adapter 340, a direct memory access (DMA) engine 350, a digital signal processor (DSP) 360, and a memory controller 370 that interacts with an external memory 305. An internal bus allows the communication between the microprocessor 310 and the packet processors 320, while a broad bus 390 connects between the packet processors 320, the Ethernet adapters 330 and the GPON adapter 340.

The broad bus 390 transfers data at high rates and its architecture is based on a push-ahead mechanism, using a binary tree topology. The broad bus 390 supports parallelism in read and write transactions and allows simultaneous transfer of data from various units at the same time. In a preferred embodiment, the broad bus 390 communicates with the various components using broad bus handlers 395. A detailed description of the broad bus 390 can be found in U.S. Pat. No. 7,370,127 assigned in common to the same assignee as the present application, which is hereby incorporated for all that it contains.

The microprocessor 310 executes commands received from the packet processors 320-A and 320-B. The microprocessor 310 performs fast processing, where the execution of each command is completed in one clock. In an exemplary embodiment of the present invention, the microprocessor 310 may be a high-performance MIPS microprocessor including at least instruction cache and a data cache. Other types of microprocessors are contemplated.

Figure 2:
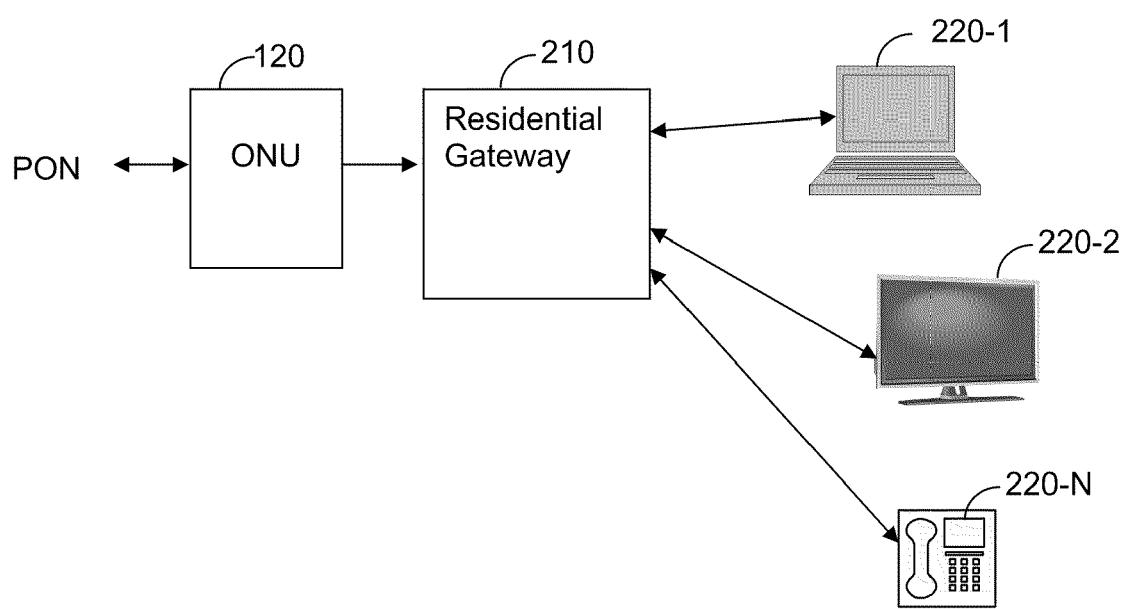
FIG. 2 shows a typical installation of a residential gateway connected to an ONU.

Each of the Ethernet MAC adapters 330 includes an Ethernet interface for interfacing with endpoint devices 220 (see FIG. 2). An Ethernet MAC adapter 330 is capable of receiving upstream data flow from endpoint devices 220 and transmitting downstream data to these devices. Either upstream or downstream data flows are respectively forwarded to or received from one or more packet processors 320-A and 320-B via the broad bus 390. More specifically, the Ethernet MAC adapter 330 in the downstream direction handles IPTV packets, such packets encapsulate video data of program being broadcasted. In addition, downstream data includes IP packets received from a WAN (through the GPON adapter 340) and are multicast through the Ethernet MAC adapters 330 to the endpoint devices. As will be described in detail below the multicasting is performed under the control of at least one of the packet processors 320-A and 320-B. Upstream data packets received through the Ethernet MAC adapter 330 from an endpoint device can be also multicast to different endpoint devices 220.

The GPON MAC adapter 340 is capable of processing upstream and downstream traffic in accordance with the GPON standard. The GPON standard is designed to allow data transmission at a rate of up to 2.488 Gbps while ensuring data security and quality of service (QoS). The GPON MAC 340 supports a plurality of traffic containers (T-CONTs). A T-CONT is a virtual upstream channel to which bandwidth is granted by the OLT 130. A single T-CONT can be allocated for an ONU 120, a class of service (CoS), or a logical ONU.

The DSP 360 is the handler of voice services and provides an interface to a telephone device connected to the gateway 300. The DSP 360 is adapted to receive and send voice samples from and to the telephone devices. Specifically, analog voice signals received from a telephone device are sampled by the DSP 360 and saved in the external memory 305. These samples are further processed by the microprocessor 310, which generates IP packets to include the voice data. Similarly, the microprocessor 310 processes input IP packets including voice data and stored the processed packets in the memory 305. The DSP 360 retrieves the data packets from the memory and generates a voice signals which are sent to a telephone device. The microprocessor 310 also processes IPTV packets.

In accordance with an embodiment of the invention, each of the packet processors 320-A and 320-B multicast packets and is further adapted to perform GPON as well residential gateway processing tasks. The GPON residential gateway 200 and its packet processors are described in detail in co-pending U.S. application Ser. No. 12/254,187 entitled "A gigabit passive optical network (GPON) residential gateway", assigned in common to the same assignee as the present application, and which is hereby incorporated for all that it contains.

In accordance with the principles of the invention, the GPON residential gateway 210 provides a flexible multicasting solution, while maximizing the efficiency of the memory usage. To this end, a downstream packet received at the GPON MAC adapter 340 is assembled in the external memory 305. Then, a packet processor 320-A or 320-B processes the reassembled packet to determine if the packet should be multicast to a multicast group. The determination is based on at least a destination MAC address in the incoming packet. The network operator may also set preconfigured parameters that would determine if an incoming packet should be multicast.

If the input data packet should be multicast, a packet processor 320 duplicates only the header of the incoming packet as to the number of egress ports. The duplicated headers are modified to uniquely designate the destination egress ports. For example, a different virtual LAN (VLAN), such as defined in the IEEE 802.1Q specification, is added to the header. Thereafter, a packet processor 320-A or 320-B passes each modified header together with a pointer to the location of payload portion of the external memory 305 to a destination Ethernet MAC adapter 330. It should be noted that the header duplication is performed only if the header modification is required; otherwise, the incoming packet is sent to all destination end-point devices.

Figure 4:
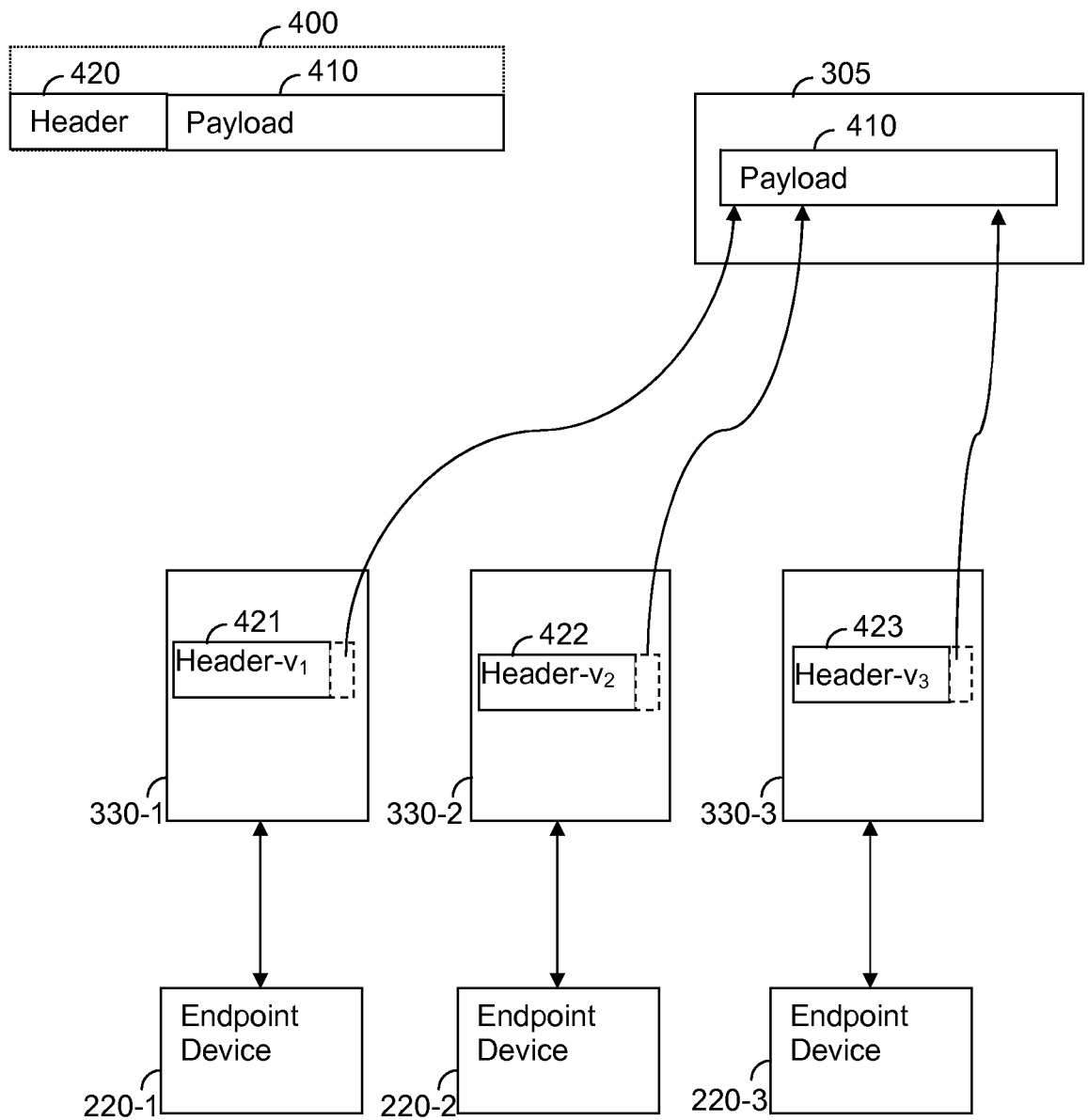
FIG. 4 is a diagram illustrating the process of multicast incoming data packet.

This process is further illustrated in FIG. 4 where an input packet 400 is multicast to three endpoint devices 220-1, 220-2 and 220-3 respectively coupled to Ethernet MAC adapters 330-1, 330-2, and 330-3. A payload portion 410 of the input packet 400 is saved in the external memory 305, while a header 420 is duplicated three times as headers 421, 422 and 423. Each modified version includes a unique identifier designating an egress port (or an output interface) in the respective Ethernet MAC adapters 330. In accordance with an embodiment of the invention, the copies of the headers are indexed. Each of the headers 421, 422 and 423 is passed to its respective Ethernet MAC adapter 330 together with a pointer to the payload portion 410 stored in the external memory 305.

It should be appreciated that the size (i.e., number of bytes) of a header is significantly less than the payload portion, therefore the memory bandwidth utilized when duplicating only the header is negligible in comparison to duplicating the entire packet or only the payload portion. For example, the size of a header 420 might be 64 bytes and the size of the payload portion 410 might be 1024 bytes.

In order to transit a payload portion of a packet to an endpoint device, an Ethernet MAC adapter 330 retrieves the payload portion from the external memory 305, assembles the header to the payload portion, and sends the assembled packet to the destination endpoint device through an egress port designated in the modified header.

Figure 5:
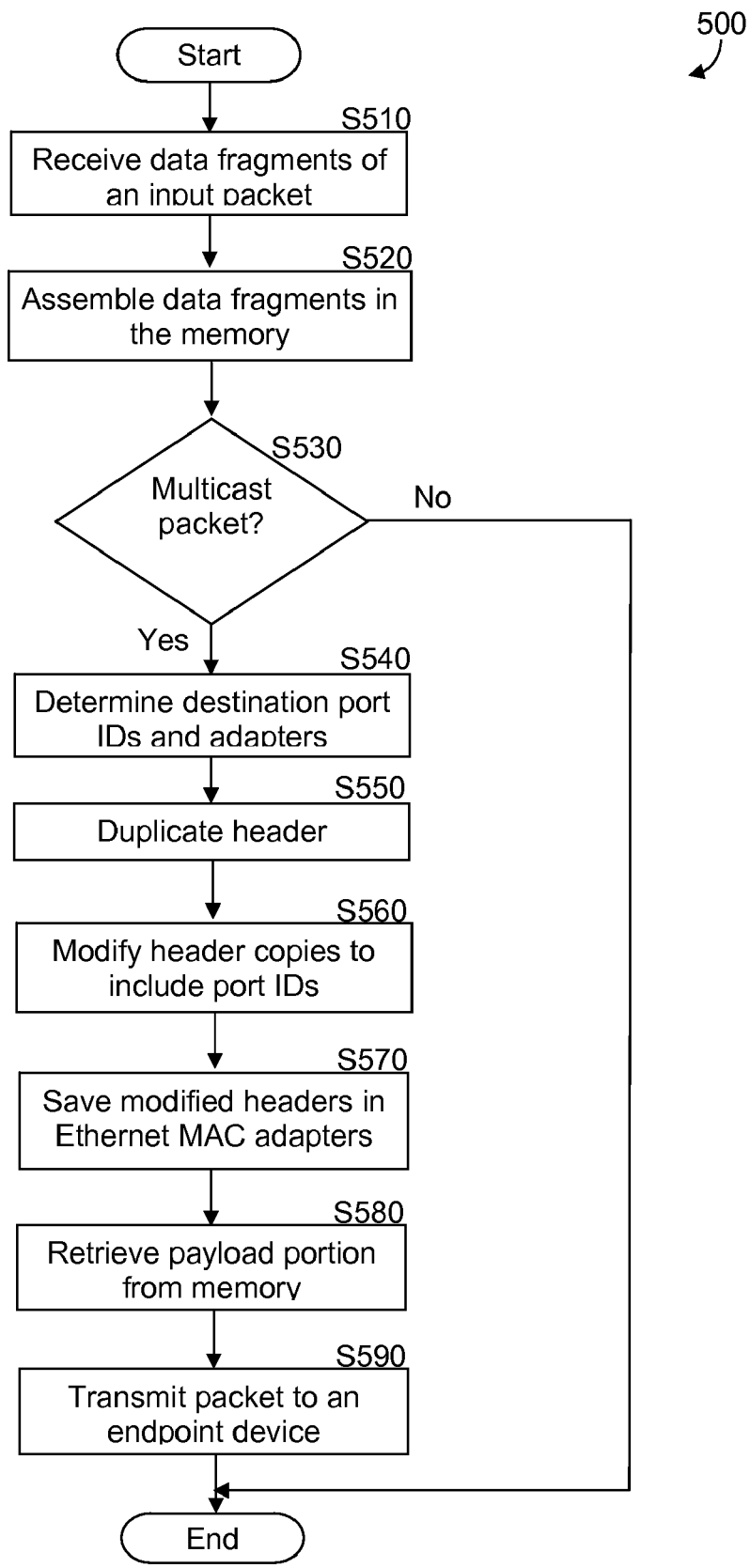
FIG. 5 is a flowchart describing the method for multicasting downstream data packets implemented in accordance with an embodiment of the invention.

FIG. 5 shows a non-limiting and exemplary flowchart 500 useful in describing the process of multicasting downstream data packets implemented in accordance with an embodiment of the invention. A downstream packet is received at the GPON MAC adapter 340 and output through one of the Ethernet MAC adapters 330. At S510, an input packet (e.g., a packet 400) is received as data fragments at the GPON MAC adapter 340. At S520, incoming data fragments are assembled in the external memory 305. This is performed by a board bus adapter 395 (indicated in FIG. 3 as "BB Handler") interfacing between the broad bus 390 and the GPON MAC adapter 340. Data fragments are sent to the external memory 305 through the DMA engine 350. While assembling the data fragments, validity checks are performed on the assembled packet. These checks include at least bit errors and length checks. At S530, it is determined if the assembled packet should be multicast to members of a multicast group, and if so execution continues with S540, otherwise, execution ends.

At S540, the packet processor 320 determines the egress port and the Ethernet MAC adapters 330 through which the input packet should be sent to destination endpoint devices designated in the multicast group. At S550, the header (e.g., a header 420) of the input packet is duplicated as the number of endpoint devices in the multicast group. Then, at S560, each copy of the header is modified to include a unique identifier for each egress port determined at S540. At S570 each modified header is passed to its destination Ethernet MAC adapter 330 together with a pointer to the location of the payload portion in the external memory 305.

At S580, when a destination Ethernet MAC adapter 330 is scheduled to transmit the packet, the data chunks are retrieved from the external memory 305. The access to the external memory 305 is through a respective broad bus handler 395 and the DMA engine 350. At S590 upon reception of the entire packet, at the Ethernet MAC adapter 330 the packet is being transmitted to the subscriber device connected to the adapter 330. It should be noted that each packet processor 320 supports a pipeline architecture, thus at any specific time more than one packet is being processed. In addition, a packet processor 320 does not require completing the processing of a packet before starting to process the next packet. It should be further noted that duplication of headers is required only if header should be modified. If no modification is required, then the incoming packet is sent to the destination end-point devices.

It should be appreciated that the method described herein can be easily adapted to multicast packets received from one of the Ethernet MAC adapters 330 to other endpoint devices connected to other Ethernet MAC adapters 330. Similarly, the payload portion of a packet received on the Ethernet MAC adapter 330 is saved in the external memory 305 and its header is duplicated. Each copy of the header is modified and passed (together with the pointer to the payload portion) to an Ethernet MAC adapter 330 connected to a destination endpoint device.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What we claim is:

1. A method for multicasting packets in a passive optical network (PON) residential gateway, comprising:
   storing a payload portion of an input packet in a memory, wherein the input packet is any one of an upstream packet and a downstream packet;
   duplicating only a header of the input packet to create duplicated headers as the number of destination endpoint devices;

modifying each of the duplicated headers to uniquely designate an output interface of each of a plurality of Ethernet medium access control (MAC) adapters coupled to at least one of the destination endpoint devices;

passing to each of the plurality of Ethernet MAC adapters its respective modified header together with a pointer to a location of the payload portion in the memory;

generating by the each of the plurality of Ethernet MAC adapters a multicast packet by retrieving the payload portion from the memory and attaching the modified header to the payload portion; and transmitting the multicast packet to the destination endpoint device coupled to the Ethernet MAC adapter.

2. The method of claim 1, wherein the PON is at least Gigabit PON (GPON).

3. The method of claim 2, wherein the modifying the duplicated header comprising: adding a virtual local area network (VLAN) tag.

4. The method of claim 1, further comprising:
checking if the header of the input packet should be modified; and
sending the input packet to the destination endpoint devices if the header should not be modified.

5. The method of claim 1, wherein the input downstream packet is received from an optical line terminal (OLT) of the PON.

6. The method of claim 1, wherein the input upstream packet is received from an endpoint device connected to a local area network (LAN).

7. The method of claim 1, further comprising: determining if the input packet should be multicast, wherein the determination is based on at least a destination medium access (MAC) address of the input packet.

8. A residential gateway for multicasting data packets in a passive optical network (PON), comprising:
a plurality of Ethernet media access control (MAC) adapters for interfacing with a plurality of endpoint devices;
a PON MAC adapter for interfacing with an optical line terminal (OLT) of the PON; and
a memory for storing at least payload portions of input packets, wherein the input packets are any one of upstream packets and downstream packets;
at least one packet processor for performing the process of multicasting an input packet by:
storing a payload portion of the input packet in the memory;
duplicating only a header of the input packet to create duplicated headers as the number of destination endpoint devices;
modifying each of the duplicated headers to uniquely designate an output interface of each of the plurality of Ethernet MAC adapters coupled to at least one of the destination endpoint devices;
passing to the each of the plurality of Ethernet MAC adapters its respective modified header together with a pointer to a location of the payload portion in the memory;
the each of the plurality of Ethernet MAC adapters performs:
generating a multicast packet by retrieving the payload portion from the memory and attaching the modified header to the payload portion; and
transmitting the multicast packet to the destination endpoint device coupled the Ethernet MAC adapter.

9. The residential gateway of claim 8, wherein the PON is at least a Gigabit PON (GPON).

10. The residential gateway of claim 8, wherein the input packet is received through the PON MAC adapter.

11. The residential gateway of claim 8, wherein the input packet is received through an Ethernet MAC adapter connected to an endpoint device.

12. A non-transitory computer readable medium having stored thereon a computer executable code causing a packet processor of a passive optical network (PON) residential gateway to perform a process of multicasting, comprising:
storing a payload portion of an input packet in a memory, wherein the input packet is any one of an upstream packet and a downstream packet;
duplicating only a header of the input packet to create duplicated headers as the number of destination endpoint devices;
modifying each of the duplicated header to uniquely designate an output interface of each of a plurality of Ethernet medium access control (MAC) adapters coupled to at least one of the destination endpoint devices;
passing to the each of the plurality of Ethernet MAC adapters its respective modified header together with a pointer to a location of the payload portion in the memory;
generating by the each of the plurality of Ethernet MAC adapters a multicast packet by retrieving the payload portion from the memory and attaching the modified header to the payload portion; and
transmitting the multicast packet to the destination endpoint device coupled to the Ethernet MAC adapter.

* * * * *